United States Patent [19]

Werner

[11] 4,145,865

[45] Mar. 27, 1979

[54] MACHINE OF MOWER OR MOWER-CONDITIONER TYPE

[75] Inventor: Anton Werner, Saverne, France

[73] Assignee: Kuhn, S.A., Saverne, France

[21] Appl. No.: 768,896

[22] Filed: Feb. 15, 1977

[30] Foreign Application Priority Data

Feb. 25, 1976 [FR] France .............................. 76 05925

[51] Int. Cl.² .......................................... A01D 49/00
[52] U.S. Cl. .................. 56/14.4; 56/DIG. 1
[58] Field of Search ..................... 56/1, DIG. 1, 14.5, 56/295, 13.6, 14.4

[56] References Cited

U.S. PATENT DOCUMENTS

| 2,986,864 | 6/1961 | Young ..................................... 56/503 |
| 3,165,872 | 1/1965 | Praca ................................. 56/DIG. 1 |
| 3,656,284 | 4/1972 | Meek et al. ....................... 56/DIG. 1 |
| 3,672,136 | 6/1972 | Peacock et al. ................. 56/DIG. 1 |
| 3,673,779 | 7/1972 | Scarnato et al. ................ 56/DIG. 1 |
| 4,050,224 | 9/1977 | Oosterling et al. ..................... 56/295 |

Primary Examiner—Russell R. Kinsey
Attorney, Agent, or Firm—Young & Thompson

[57] ABSTRACT

The disclosure is of a machine of mower or mower-conditioner type in which the working width is substantially equal to the total width and a drive element directly communicates its rotating movement to one of the discs mounted on an elongated housing which supports all the discs, of which that which co-operates with the drive element can advantageously be uncoupled therefrom.

7 Claims, 6 Drawing Figures

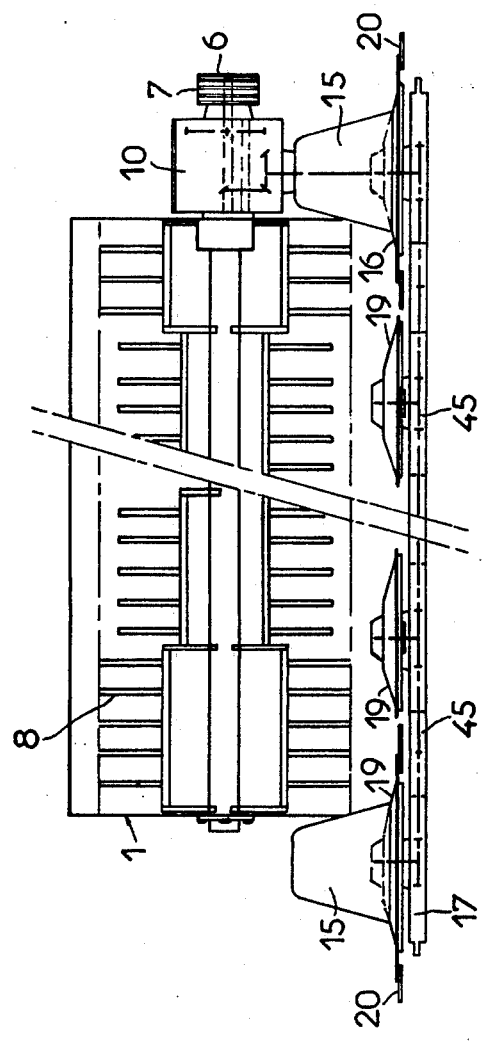

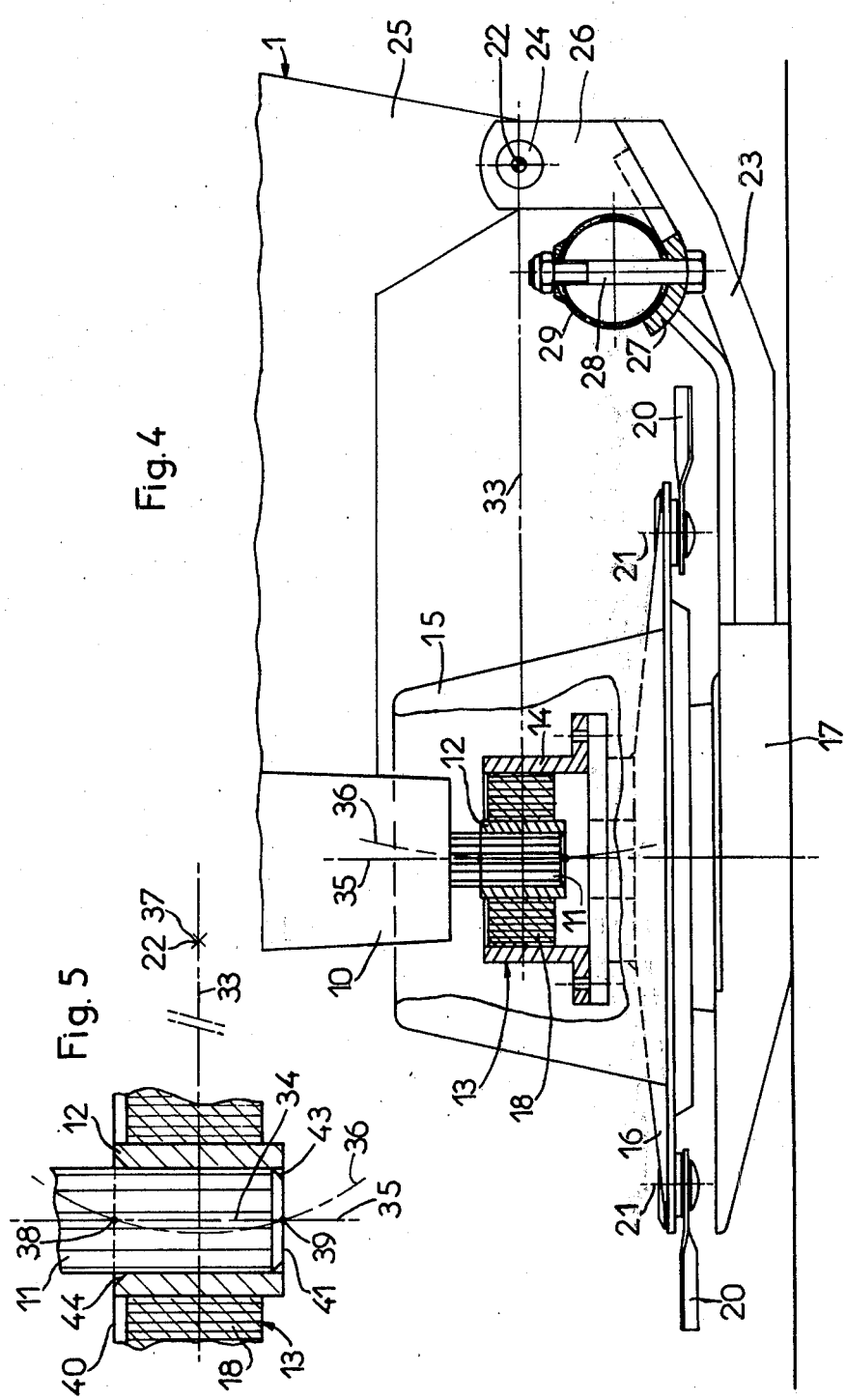

MACHINE OF MOWER OR MOWER-CONDITIONER TYPE

INTRODUCTION AND BACKGROUND OF THE INVENTION

The present invention relates to agricultural machines of the mower or mower-conditioner type which can be placed before or behind a tractor or laterally thereof. These machines comprise cutting element carriers in the form of discs or the like mounted on a elongated housing containing the transmission element intended to drive these discs in rotation.

Machines of this kind are known where the elongated housing is fixed in relation to the frame. This is the case especially when a drive element communicates its rotating movement directly to one of the discs, the other discs being driven in rotation by transmission elements mounted within the elongated housing. The advantage of these machines resides in the fact that their working width is substantially equal to their overall width. On the other hand the changing of the disc coupled to the drive element is impractical, since it is necessary completely to dismantle the elongated housing and to refit it; as this work is difficult it necessitates the presence of two persons.

Machines are also known, especially of the mower-conditioner type, which are drawn both at work and in the transport position, wherein the cutting mechanism and the conditioning mechanism are articulated as a whole or mounted floating in a chassis so that they can be raised for transport in order to avoid all risk of damage to the discs and/or cutting elements. Thus the width of the chassis in these machines is greater than their working width. With such machines, running over still-standing fodder without cutting it is unavoidable, and this is harmful to the fodder. Moreover on this type of machine the discs are relatively difficult of access in view of the presence of element for conditioning or conveying the fodder, situated above the discs. Thus the replacement of a disc is as difficult as in the case of the machines as described above.

BRIEF SUMMARY OF THE INVENTION

The present invention remedies all these drawbacks by proposing a machine of mower or mower-conditioner type in which the working width is substantially equal to the total width and a drive element such as a drive shaft directly communicates its rotating movement to one of the discs mounted on the elongated housing which supports all the discs, of which that which co-operates with the drive shaft can advantageously be uncoupled therefrom.

FURTHER DESCRIPTION AND ADVANTAGES OF THE INVENTION

In fact said machine comprises means for pivoting only the elongated housing in relation to said drive shaft about an axis for example substantially parallel with the cutting edge of the discs. Thus during work the elongated housing of a mower-conditioner equipped in accordance with the invention is fixed in relation to the conditioning elements of the machine, which brings about conditioning of constant quality, in constrast with machines of the same type where the elongated housing can follow the irregularities of the ground but is never situated in a fixed position in relation to the conditioning elements.

According to another characteristic of the invention a coupling device, preferably of flexible type, connects the drive shaft with the disc with which it is to co-operate.

Finally according to a supplementary characteristic of the invention the position of the drive shaft in relation to the coupling device fast with the said disc is such that the coupling of the said shaft with the said device is automatic when the elongated housing is returned into working position by pivoting it about its pivot axis.

The invention will be explained in greater detail, with further characteristics and advantages, by reference to a nonlimitative example of embodiment described hereinafter with reference to the accompanying drawings, wherein:

BRIEF DESCRIPTION OF THE VIEWS IN THE DRAWINGS

FIG. 1 represents a machine according to the invention in the working position,

FIG. 2 shows a similar view in which the machine is situated in the raised position permitting uncoupling of its elongated housing, as represented in chain lines, FIG. 3 shows a front view of the machine in the working position, FIG. 4 represents, on a larger scale, the device for coupling one of the discs of the elongated housing, coupled with the drive shaft of the machine, FIG. 5 shows in detail the positions of the drive shaft and the coupling device in relation to the axis of articulation of the elongated housing, FIG. 6 shows a plan view of the elongated housing in section at the level of its pivot axis.

DETAILED DESCRIPTION OF THE PREFERRED EMBODIMENTS

Figure 1:
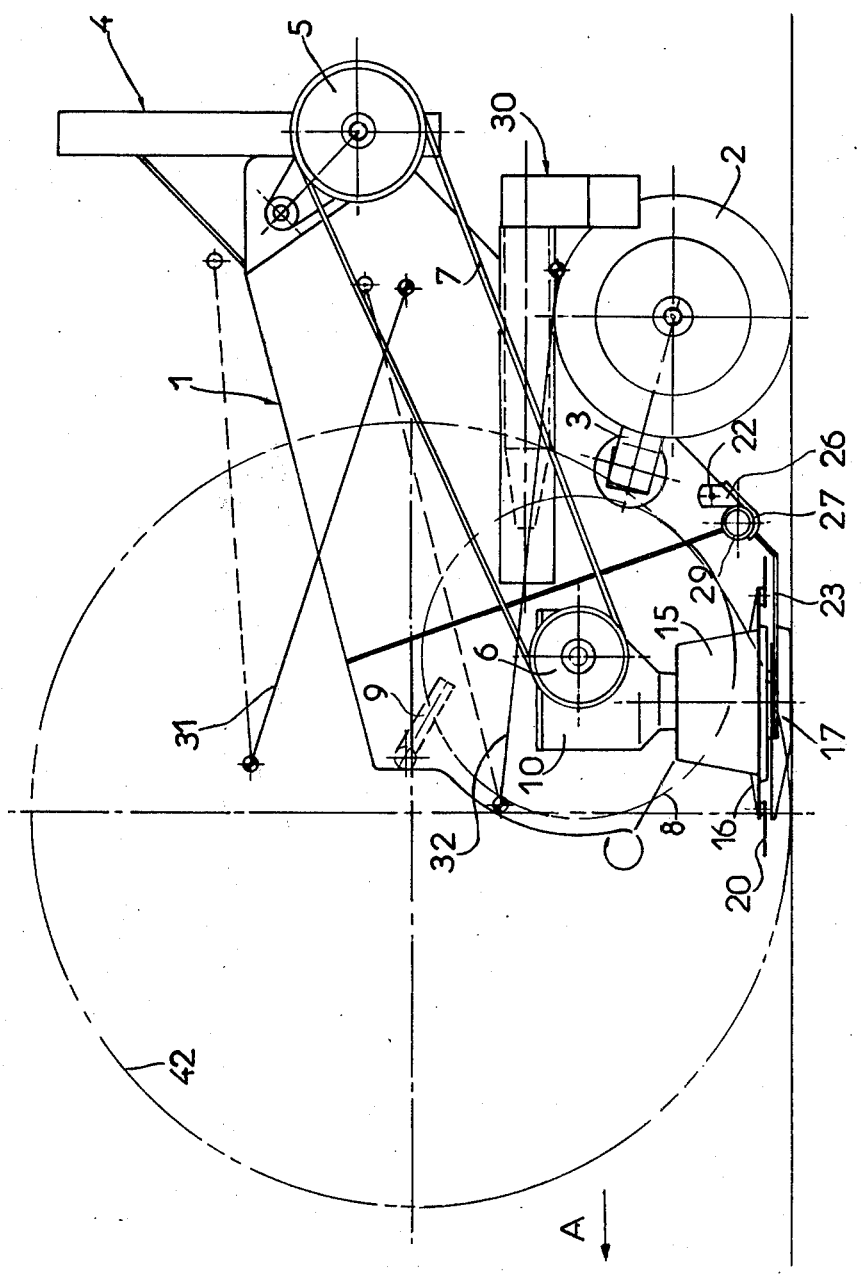

As shown in the drawings, the machine according to the invention, which is of the mower-conditioner type, comprises a frame 1 which is intended to travel, in the working position, in the direction of the arrow A. As represented in FIG. 1 the machine can run over the ground to be mown by means of wheels 2 connected to the frame 1 by suspension arms 3. In the transport position this mower-conditioner is mounted on and connected to a rearwardly mounted tractor lift linkage 4.

Figure 2:
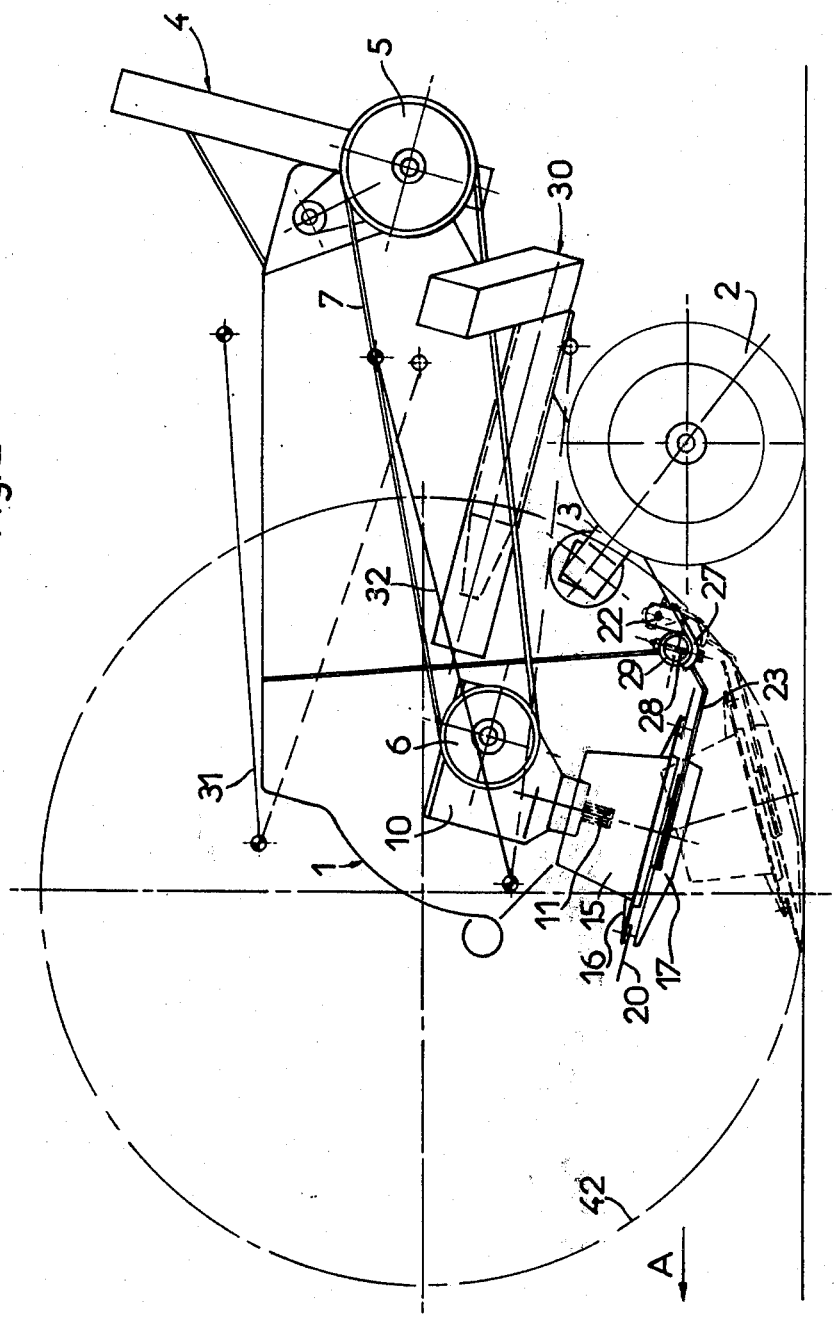

In FIGS. 1 and 2 it is seen that the frame 1 of the machine is likewise provided with transmission elements comprising especially two pulleys 5 and 6 each provided with grooves, said pulleys being interconnected by belts 7 passing in said groove. The pulley 5 is driven by the power take-off of the tractor, while the pulley 6 directly drives the conditioning elements 8, which co-operate with an adjustable comb 9 mounted between the two lateral sides of the machine as disclosed in U.S. Pat. No. 3,699,755. This pulley 6 also transmits a certain power to a drive shaft 11, which may be seen in FIGS. 2 to 4, this power being transmitted through the intermediary of a gear box 10. As may be seen particularly well from FIG. 4, the drive shaft 11, the extremity of which is splined, co-operates with the internal sleeve 12 of a flexible coupling device 13. This device likewise comprises an external sleeve 14 fixed rigidly on the disc 16 mounted on one of the extremities of the elongated housing 17, said device 13 being lodged for the purpose of its protection in a hollow frusto-conical cap 15 fast with the disc 16.

An elastic substance 18 connects the internal splined sleeve 12 with the external sleeve 14, permitting a certain deformation of the internal sleeve 12 in relation to the external sleeve 14. Such deformation can be axial, radial or angular. The rotating movement transmitted by the drive shaft 11 to the disc 16 through the intermediary of the flexible coupling device 13 is communicated to the other discs 19 of the elongated housing 17 by means of transmission members such as pinions 45, which may be seen in FIG. 3 and are mounted within the elongated housing 17 so that they drive the discs 19 from beneath. These pinions 45, driven by the disc 16, drive the discs 19 so that the discs 16, 19 rotate in opposite directions to one another. The discs 16, 9 situated at the extremities of the elongated housing are equipped each with a cap 15 and rotate in opposite directions to one another so as to bring the cut fodder towards the conditioning elements 8, which may be in the form of a flail rotor, in the form of crusher rollers or in any other form effecting conditioning of the fodder. This disc 16 and the discs 19 are equipped with cutting elements 20 in the form of knives articulated about a spindle 21, which permit the mowing of the fodder. From FIGS. 1 and 3 it is also seen that the conditioning elements 8 are situated immediately above the discs 16, 19. This permits conditioning of the fodder over a width substantially equal to that of the swath cut by the cutting edges of the machine. Such conditioning is especially efficacious and uniform, in constrast with that obtained with mower-conditioners having a cutting mechanism of the drum type, where all the cutting elements are driven from, above, the fodder being capable of being conditioned over only a small width between the drums.

Figure 6:
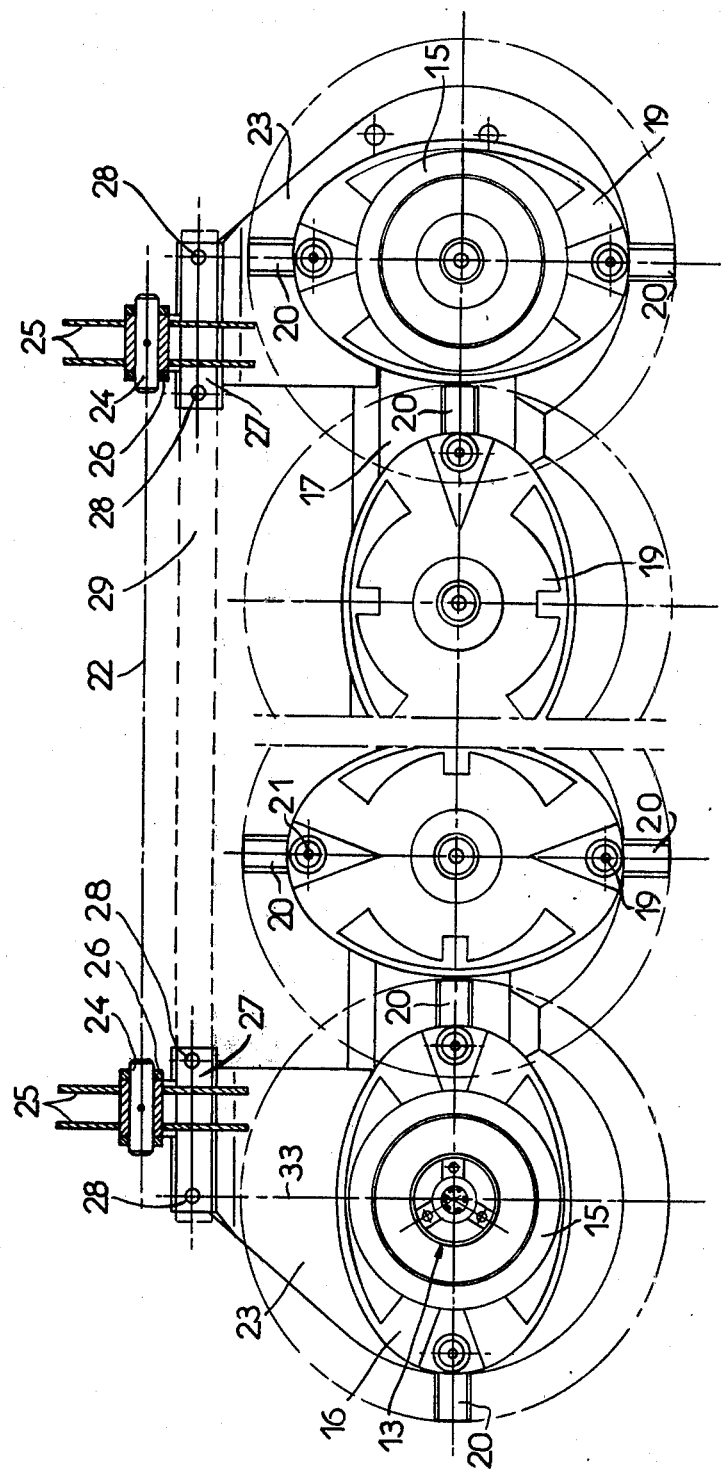

As all the discs 16, 19 have parts likely to be due to wear once or more in the course of a season, it is particularly advantageous to be able to gain access to the discs 19, and above all to the disc 16 provided with its cap 15 and co-operating with the drive element 11 by means of the coupling device 13. With this aim the elongated housing can pivot about a pivot axis 22 parallel with the cutting front of the discs 16 and 19. To this end the two extremities of the elongated housing 17 are each provided with a rearwardly extending arm 23. One of the extremities of these arms 23 is fixed rigidly to the elongated housing 17 while the other is articulated about pivots 24 fast with the walls 25 of the machine frame. The extremity of each arm 23 which is articulated about a pivot 24 is in the form of a clevis 26 the two parts of which engage respectively on either side of the walls 25 of the machine frame 1, as may be seen from FIG. 6. This construction ensures perfect translational immobilisation of the elongated housing 17.

The arms 23 likewise comprise stops 27 co-operating by means of nuts and screws 28 with an abutment 29 in the form of a tube extending parallel with the pivot axis 22 of the elongated housing 17. These stops 27 and this abutment 29 permit of immobilising the elongated housing 17 in relation to the frame 1 in the working position of the machine as represented in FIGS. 1 and 4, this immobilisation being effected by means of the nuts and the screws 28 extending through the stops 27 and the abutment 29.

The manner of operation of the agricultural machine according to the invention is as follows: When it is desired to work upon one of the discs 16 or 19 in the course of work of the machine, the connection between the stops 27 of the arms 23 and the abutment 29 is disengaged by unscrewing the screws 28, then the front of the machine is raised with the aid of a device 30 actuated by bars 31 and 32 of the hydraulic lift system of the tractor, the silhouette of the rear wheels 42 of which may be seen in FIGS. 1 and 2, the machine being coupled to the rear of the tractor in an off-centre position. With the elongated housing 17 resting on the ground, an uncoupling of the drive shaft 11 occurs, the latter emerging from the internal sleeve 12. Thus a single person can easily and effortlessly pivot the frame 1 of the machine in relation to the elongated housing 17, which is then well clear and particularly easy of access, permitting for example of replacement of all the discs 16, 19 of the elongated housing 17, without impediment by the conditioning elements 8.

To recouple the frame 1 of the machine to the elongated housing 17, the reverse procedure is adopted, that is to say the frame 1 of the machine is lowered in the direction of the elongated housing 17 with the aid of the device 30 controlled by the bars 31 and 32 of the hydraulic lift system of the tractor. Upon this lowering of the machine frame 1 the drive shaft 11 automatically comes into engagement in the internal sleeve 12 without any need for procedure by trial and error to place the two elements 11 and 12 opposite to one another. Such a result can be achieved by reason of the position which the one of the elements occupies in relation to the other. In fact a straight line 33, visible in FIGS. 4, 5 and 6 passing through the pivot axis 22 of the elongated housing 17 and through the coupling device 13 constitutes the mediatrix of a chord 34 coinciding with the axis 35 of the coupling device 13. This chord 34 is limited by an arc 36 of a circle the centre 37 of which is situated on the articulation axis 22 of the elongated housing 17. The two points 38 and 39 which constitute the extremities of this chord 34 and coincide with the extremities of the arc 36 are situated respectively at the centre of the upper extremity 40 of the coupling device 13 and at the centre of the lower extemity 41 of the drive shaft 11. In the course of the rotation of the frame 1 in relation to the elongated housing 17, when the drive shaft 11 disengages from the internal sleeve 12, the point 39 moves along the arc 36 to come into coincidence with the point 38 representing the centre of the upper part 40 of the coupling device 13. Thus it is seen that once clear of the internal sleeve 12, the drive shaft 11 is ready to be reengaged therein since the centres 38 and 39 of these two elements 11 and 12 are in coincidence. On the other hand this is not the case in the course of the actual coupling and uncoupling of the drive shaft 11 with the internal sleeve 12, since the centre 39 of the lower part 41 of said shaft 11 follows the arc 36. The internal sleeve 12 must thus be displaced radially and angularly in relation to its axis 35 in the course of the first part of the coupling of the shaft 11 with the sleeve 12. In the course of the second part of this coupling said sleeve 12 returns into position in order to be refitted on the axis 35 of the coupling device 13. This variation of position of the internal sleeve 12 in relation to the external sleeve 14, which remains fast, explains the necessity of the elastic substance 18 interposed between the internal sleeve 12 and the external sleeve 14.

In order to facilitate the engagement of the drive shaft 11 in the internal sleeve 12, the lower extremity 41 of the shaft 11 comprises a chamfer 43. Likewise a chamfer 44 is provided on the upper part of the sleeve 12.

As the machine as described above is only an example of embodiment, without departing from the scope of the present invention it is possible to effect various improvements, modifications or additions thereto or to replace certain elements by equivalent elements, without modifying the general economy thereof. Moreover, although the above-described example of embodiment relates to a mower-conditioner, the present invention is likewise applicable to the field of mowers, and especially that of frontal mowers.

What is claimed is:

1. In an agricultural machine of the mower or mower-conditioner type which comprises cutting element carriers in the form of discs or the like mounted on an elongated housing containing transmission elements that drive the discs in rotation by a driven shaft communicating its rotating movement directly to one of the discs mounted on the elongated housing; the improvement in which the machine comprises means for pivoting the elongated housing and drive shaft relative to each other whereby said drive shaft may be uncoupled from or coupled with the disc to which the drive shaft is to impart its rotating movement.

2. A machine according to claim 1, and means mounting the elongated housing to pivot about a pivot axis substantially parallel with the cutting edge of its discs, said housing having arms rigidly fixed by one of their ends to the elongated housing while their other ends are articulated to the frame of the machine.

3. A machine according to claim 2, in which the ends of the arms are articulated about pivots and each arm is in the form of a clevis having two parts that straddle a wall of the machine frame, thus ensuring the translational immobilization of the elongated housing.

4. A machine according to claim 3, characterized in that the arms comprise stops cooperating with abutments fast with the machine frame, permitting the immobilization of the elongated housing in relation to the said frame.

5. A machine according to claim 1, and a flexible coupling device between said one disc and said shaft.

6. A machine according to claim 5, in which the pivot axis of the elongated housing is situated substantially the same height as the flexible coupling device.

7. A machine according to claim 5, in which a straight line passing through the pivot axis of the elongated housing and through the flexible coupling device constitutes the mediatrix of a chord coinciding with the axis of the coupling device, this chord being limited by an arc of a circle the center of which is situated on the pivot axis of the elongated housing, the extremities of this chord, which coincide with those of the arc, being situated respectively at the center of the lower extremity of the drive shaft and at the center of the upper part of the flexible coupling device, whereby when the drive shaft is to be coupled with the coupling device the two extremities of the drive shaft and coupling device are automatically situated opposite to one another.

* * * * *